(12) United States Patent
Ellis (10) Patent No.: US 7,721,060 B2
(45) Date of Patent: May 18, 2010

(54) METHOD AND APPARATUS FOR MAINTAINING DATA DENSITY FOR DERIVED CLOCKING

(75) Inventor: Robert M. Ellis, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 788 days.

(21) Appl. No.: 10/713,563

(22) Filed: Nov. 13, 2003

(65) Prior Publication Data

US 2005/0108489 A1    May 19, 2005

(51) Int. Cl.
*G06F 12/00* (2006.01)
*G06F 13/00* (2006.01)

(52) U.S. Cl. ........................ 711/167; 711/154
(58) Field of Classification Search .......... 711/167, 711/154
See application file for complete search history.

(56) References Cited

U.S. PATENT DOCUMENTS

| | | | | |
|---|---|---|---|---|
| 4,189,622 | A * | 2/1980 | Foshee | 375/373 |
| 5,239,561 | A * | 8/1993 | Wong et al. | 375/376 |
| 5,512,860 | A | 4/1996 | Huscroft et al. | |
| 5,530,696 | A * | 6/1996 | Boggs et al. | 370/252 |
| 6,038,655 | A * | 3/2000 | Little et al. | 712/32 |
| 2002/0083286 | A1* | 6/2002 | Gray | 711/167 |
| 2002/0112119 | A1* | 8/2002 | Halbert et al. | 711/115 |
| 2003/0163769 | A1* | 8/2003 | Phelps | 714/43 |
| 2003/0174544 | A1* | 9/2003 | Kim | 365/189.05 |
| 2004/0056782 | A1* | 3/2004 | Bliss et al. | 341/50 |
| 2004/0226997 | A1* | 11/2004 | Dabral et al. | 235/386 |
| 2004/0230718 | A1* | 11/2004 | Polzin et al. | 710/22 |
| 2005/0005046 | A1* | 1/2005 | Bashirullah et al. | 710/100 |

FOREIGN PATENT DOCUMENTS

| | | |
|---|---|---|
| WO | WO 85/00259 | 1/1985 |
| WO | WO2004/102403 A2 | 11/2004 |

OTHER PUBLICATIONS

"The American Heritage College Dictionary 4th Edition," 2002, Houghton Mifflin Company, pp. 361, 1185.*
"IEEE std 1596.4-1996—IEEE Standard for High-Bandwidth Memory Interface Based on Scalable Coherent Interface (SCI) Signaling Technology (RamLink)" IEEE STD 1596.4-1995, XX, XX Dec. 21, 1996, pp. 1-91, XP002333770, figure 14, p. 44.

* cited by examiner

*Primary Examiner*—Matt Kim
*Assistant Examiner*—Michael C Krofcheck
(74) *Attorney, Agent, or Firm*—Marger Johnson & McCollom, P.C.

(57) ABSTRACT

Some embodiments of the invention implement point-to-point memory channels that virtually eliminate the need for mandatory synchronization cycles for a derived clocking architecture by tracking the number of data transitions on inbound and outbound data lanes to make sure the minimum number of transitions occur. Other embodiments of the invention perform data inversions to increase the likelihood of meeting the minimum data transition density. Still other embodiments are described in the claims.

16 Claims, 6 Drawing Sheets

METHOD AND APPARATUS FOR MAINTAINING DATA DENSITY FOR DERIVED CLOCKING

BACKGROUND OF THE INVENTION

1. Technical Field of the Invention

This disclosure relates generally to memory systems, components, and methods and more particularly to a method and apparatus for maintaining data density for a derived clocking technology in a fully buffered DIMM (FBD) memory channel.

2. Description of the Related Art

Figure 1:
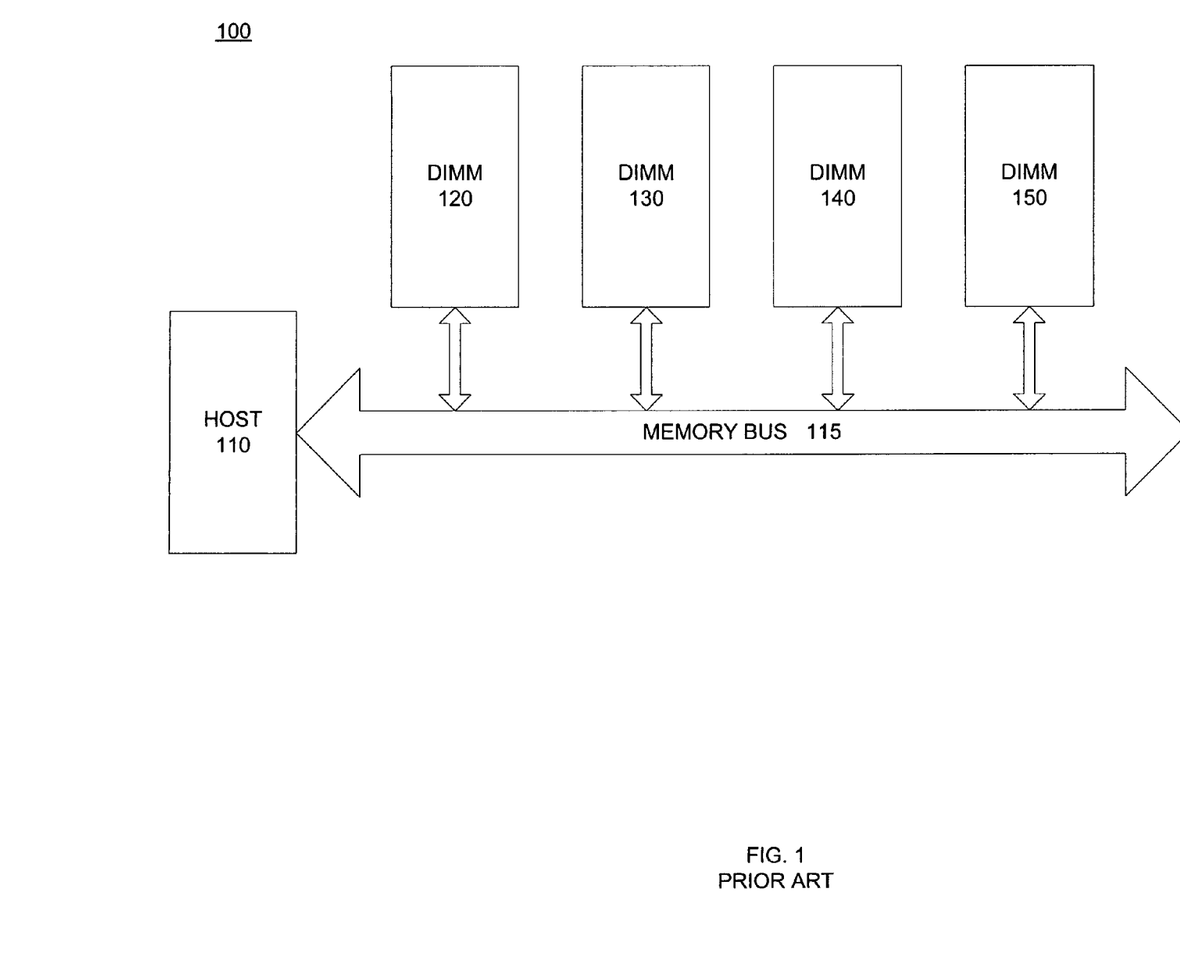
FIG. 1 is a block diagram illustrating a conventional memory channel using a "stub bus" topology.

FIG. 1 is a block diagram illustrating a conventional memory channel 100 that exhibits a "stub bus" topology. The memory channel includes a host 110 and four DIMMs 120, 130, 140, 150. Each of the DIMMs 120, 130, 140, 150 is connected to the memory bus 115 to exchange data with the host 110. Each of the DIMMs 120, 130, 140, 150 adds a short electrical stub to the memory bus 115. For approximately the past 15 years, memory subsystems have relied on this type of stub bus topology.

Simulations have shown that for applications of 2 to 4 DIMMs per memory channel, the stub bus technology reaches a maximum bandwidth of 533-667 MT/s (megatransactions/second), or 4.2-5.3 GB/s (gigabytes/second) for an eight byte wide DIMM. Achieving the next significant level, 800 megatransfers/second (MT/s) and beyond, will be difficult if not impossible with the stub bus topology.

Embodiments of the invention address these and other disadvantages of the conventional art.

DETAILED DESCRIPTION OF THE INVENTION

Figure 2:
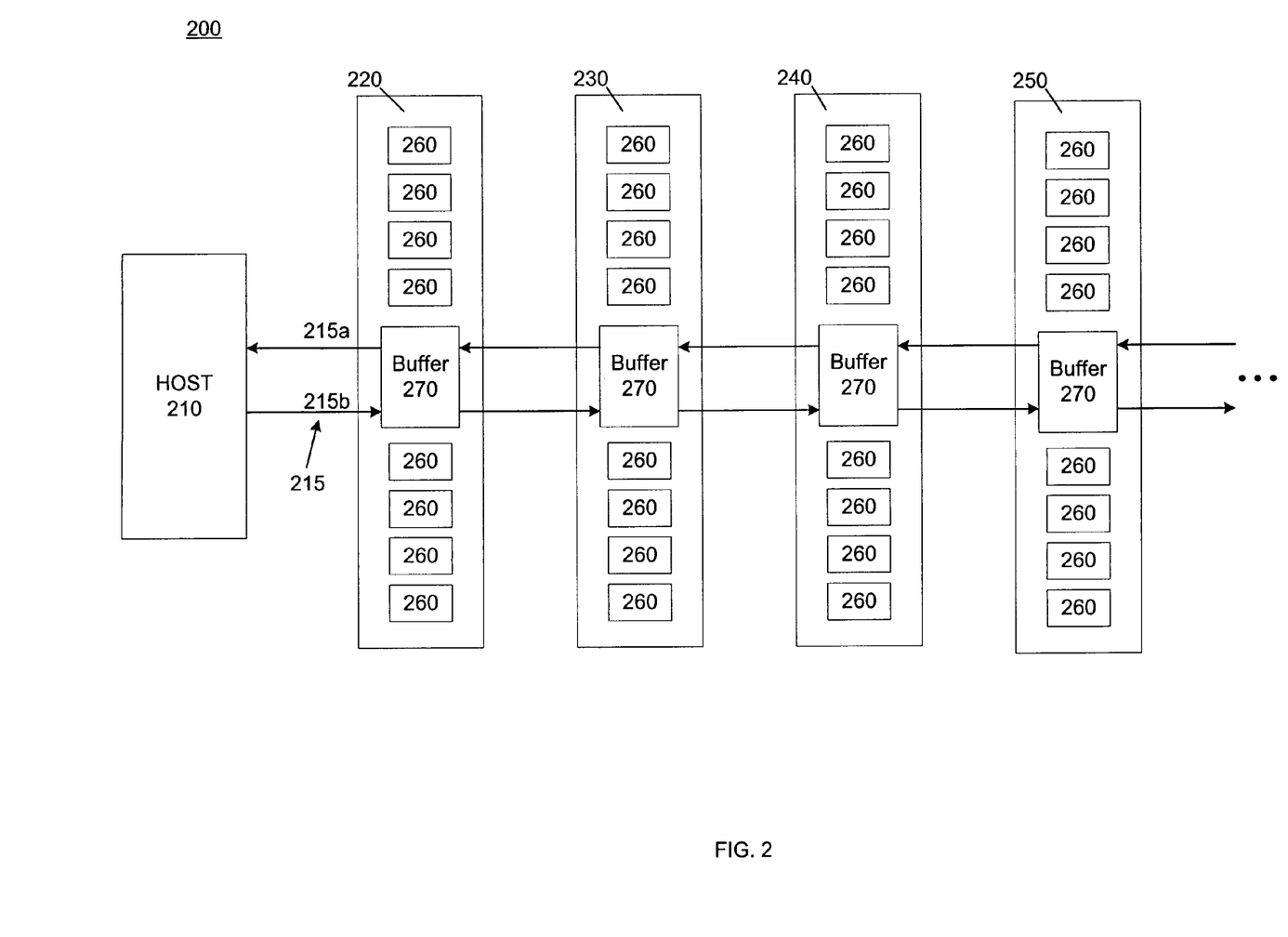
FIG. 2 is a block diagram illustrating a memory channel with a "point-to-point" topology.

In order to increase memory bandwidth requirements above 4.2-5.3 GB/s per memory channel, embodiments of the invention utilize a "point-to-point" (P2P) signaling technology. FIG. 2 is a block diagram illustrating a memory channel 200 with a P2P topology. The P2P memory channel 200 includes four DIMMs 220, 230, 240, and 250. Each of the DIMMs has eight dynamic random access memory (DRAM) devices 260. Other P2P memory channels may have more or less DIMMs, but they will nonetheless still be arranged as illustrated in FIG. 2.

The host 210 and DIMMs 220-250 are connected to a memory bus 215, where 215a represents the inbound data stream (to the host) and 215b represents the outbound data stream (from the host). In this case, the inbound data path and the outbound data path from the DIMM 250 that is furthest from the host 210 is not used, since DIMM 250 is the last in the chain.

The host 210 can include one or more microprocessors, signal processors, memory controllers, graphics processors, etc. Typically, a memory controller coordinates access to system memory, and the memory controller will be the component of host 210 connected directly to the inbound and outbound data paths 215a and 215b.

In the point to point configuration, each DIMM has a buffer chip 270. The buffer chips 270 are needed to capture signals from the inbound data stream 215a or outbound data stream 215b and re-transmit the signals to the next buffer chip 270 on a neighboring DIMM in a daisy-chain fashion. These point to point links allow high speed, simultaneous data communication in both directions, using differential signaling pairs.

The inbound and outbound data stream 215a, 215b are composed of a number of high-speed signals (not shown), where each high-speed signal is implemented by a differential pair.

Figure 3:
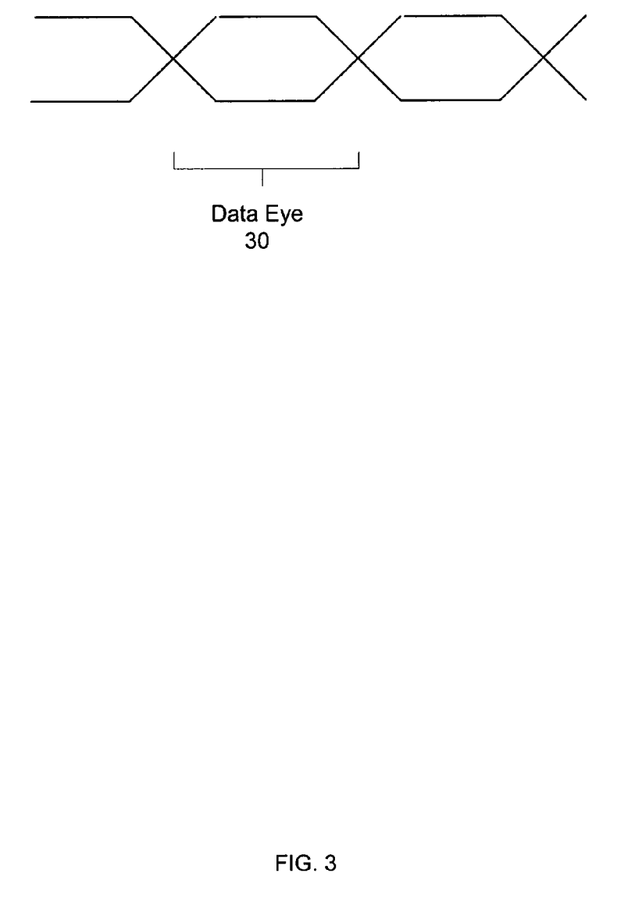
FIG. 3 is a drawing that illustrates a typical data transition for a differential pair signal.

The buffer chips 270 must latch valid data in order to capture signals from the data streams 215a, 215b. FIG. 3 is a drawing that illustrates an exemplary data transition for a differential pair that is part of the data stream 215a or 215b. The segment 30 is commonly known as the "data eye." It is preferable that the buffer chips 270 latch data when the differential signal has completed its transition. In other words, it is preferable that the buffer chips 270 latch data approximately in the middle of the data eye. Each of the buffer chips 270 generates a derived clock (not shown) for latching received data from an external reference clock and interpolates the derived clock so that it is centered with the data eye.

In order to maintain the phase relationship between the data eye and the derived clock, a certain minimum number of data transitions in a fixed time period are required. In other words, a minimum transition density must be maintained. The minimum transition density is typically on the order of 5 data transitions for every 128 clock cycles, but it may be more or less depending on system requirements.

To guarantee that the minimum number of data transitions occurs, the host 210 may periodically send a synchronization data stream that contains the required data transitions on the outbound data path 215b. Once the synchronization stream reaches the last DIMM 250, it is sent back towards the host on the inbound data path 215a, so that both the outbound and inbound data paths are synchronized. Alternatively, the synchronization data stream from the host 210 may terminate at the last DIMM 250, and the last DIMM 250 could generate another synchronization data stream that is transmitted on the inbound data path 215a to terminate at the host 210.

In order to achieve 5 data transitions every 128 clock cycles the data synchronization stream requires about 4% of the available bandwidth. Since the flow control unit (FLIT) length for a FBD memory channel is 12 cycles long, a synchronization data stream would be 12 cycles every 128 cycles or about 9.4% of the available bandwidth. In this scheme, the actual data transition density is not monitored and synchronization cycles are transmitted regardless of whether they are actually needed. Consequently, this is not a preferred implementation since data bandwidth (and system performance) is sacrificed.

Figure 4:
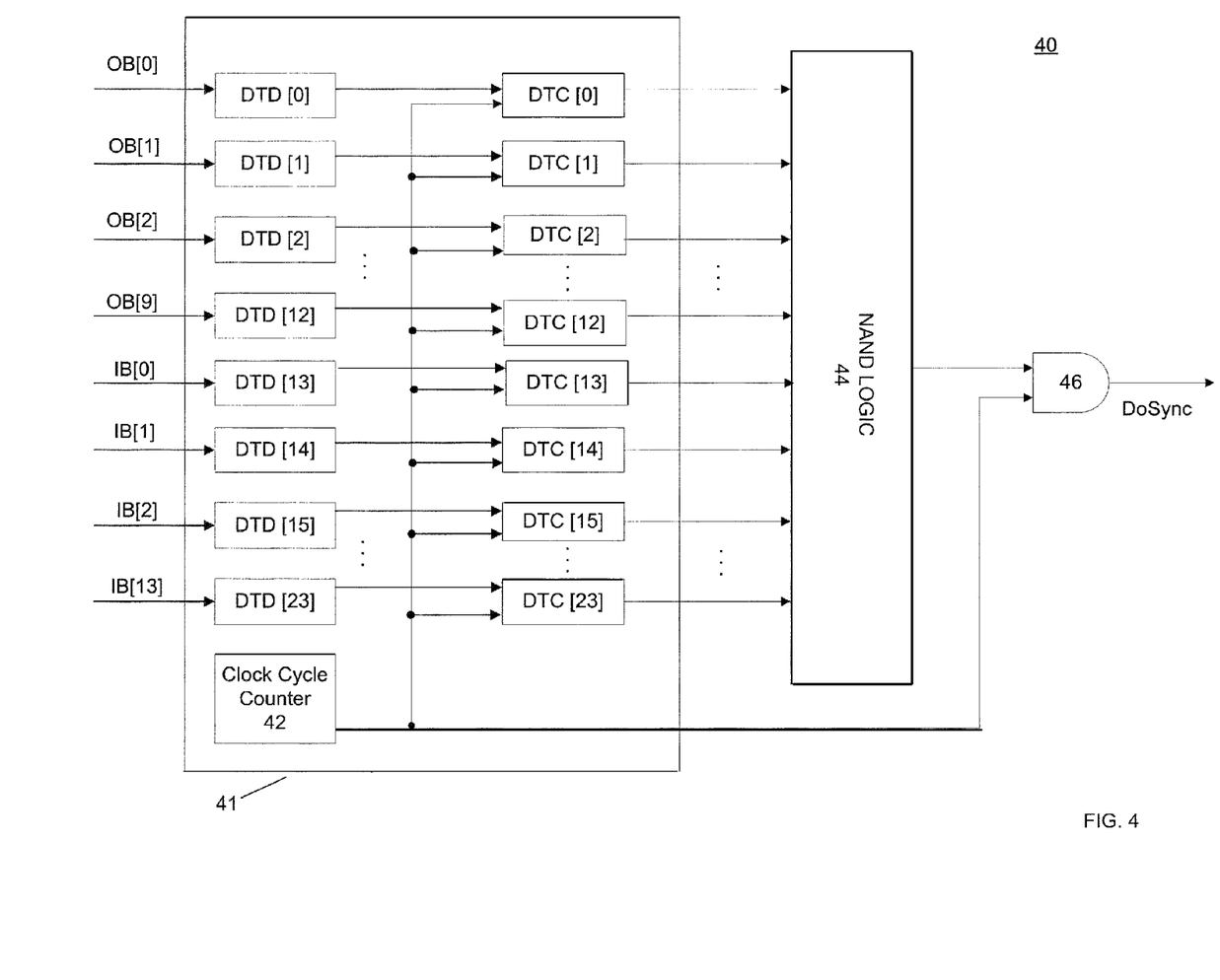
FIG. 4 is a block diagram illustrating a programmable transition density detector according to some embodiments of the invention.

FIG. 4 is a block diagram illustrating a transition density detector 40 according to some embodiments of the invention. Referring to FIG. 4, the transition density detector 40 includes a number of data transition detectors (DTDs) that have as input one of the data lanes from the outbound (OB)

data path or the inbound (IB) data path of a P2P memory channel, for example, the P2P memory channel of FIG. 2. In this particular case, there are 14 data lanes (IB[0] to IB[13]) for the inbound data path, and 10 data lanes (OB[0] to OB[9]) for the outbound data path. Each data lane OB[0-9] and IB[0-13] corresponds to a differential signal.

The DTDs [0-23] detect when the corresponding data lanes OB and IB experience a transition like those shown in FIG. 3. The DTDs [0-23] assert an output when transitions on the corresponding data lanes OB and IB are detected. The outputs of the DTDs [0-23] are inputs for a corresponding, programmable, data transition counter (DTC). In this case, the DTCs [0-23] are 3-bit, non-wraparound counters. Alternatively, the size of the counter used for the DTC may be larger or smaller. The DTCs are pre-programmed with the desired number of data transitions for a given number of clock cycles. As soon as the counter reaches the pre-programmed number, it will assert its output, indicating that the corresponding data lane has achieved the transition density specified by the pre-programmed number. For example, if DTC[0] is pre-programmed with the number 5, it will assert its output when at least 5 data transitions have occurred on the corresponding outbound data lane OB[0].

The data transition density detector 40 also includes an 8-bit, programmable, wrap-around, clock cycle counter 42. The clock cycle counter 42 is pre-programmed with the desired number of clock cycles in which the desired number of data transitions need to occur. For example, pre-programming the clock cycle counter 42 with the number 128 would cause the clock cycle counter to assert an output every 128 clock cycles. Alternatively, the number of bits in the clock cycle counter 42 may be larger or smaller. When the output of clock cycle counter 42 is asserted, it resets all of the non-wraparound DTCs [0-23].

The DTDs [0-23], the DTCs [0-23], and the clock cycle counter 42 together form a functional group 41.

The outputs of the DTCs [0-23] serve as inputs for NAND Logic 44. NAND Logic 44 will output a "1" when any of the outputs of the DTCs [0-23] are "0", indicating that one of the data lanes OB[0-9] or IB[0-13] has not reached the desired data transition density. Those with skill in the art are familiar with how this is achieved using NAND gates and so the details of NAND logic 44 will not be explained in further detail. Similarly, other embodiments may use different types of logic gates in place of NAND logic 44 in order to achieve the same results.

If the output of NAND logic 44 is "1" when the clock cycle counter 42 asserts a "1" after the specified number of clock cycles, then the inputs at the AND gate 46 are both asserted, enabling the signal DoSync. Thus, the DoSync signal is asserted when any of the data lanes OB[0-9], IB[0-13] require synchronization cycles. Similar to NAND logic 44, the logic implemented by AND gate 46 may alternatively be implemented using combinations of other logic gates that are well-known to those with skill in the art.

Figure 5:
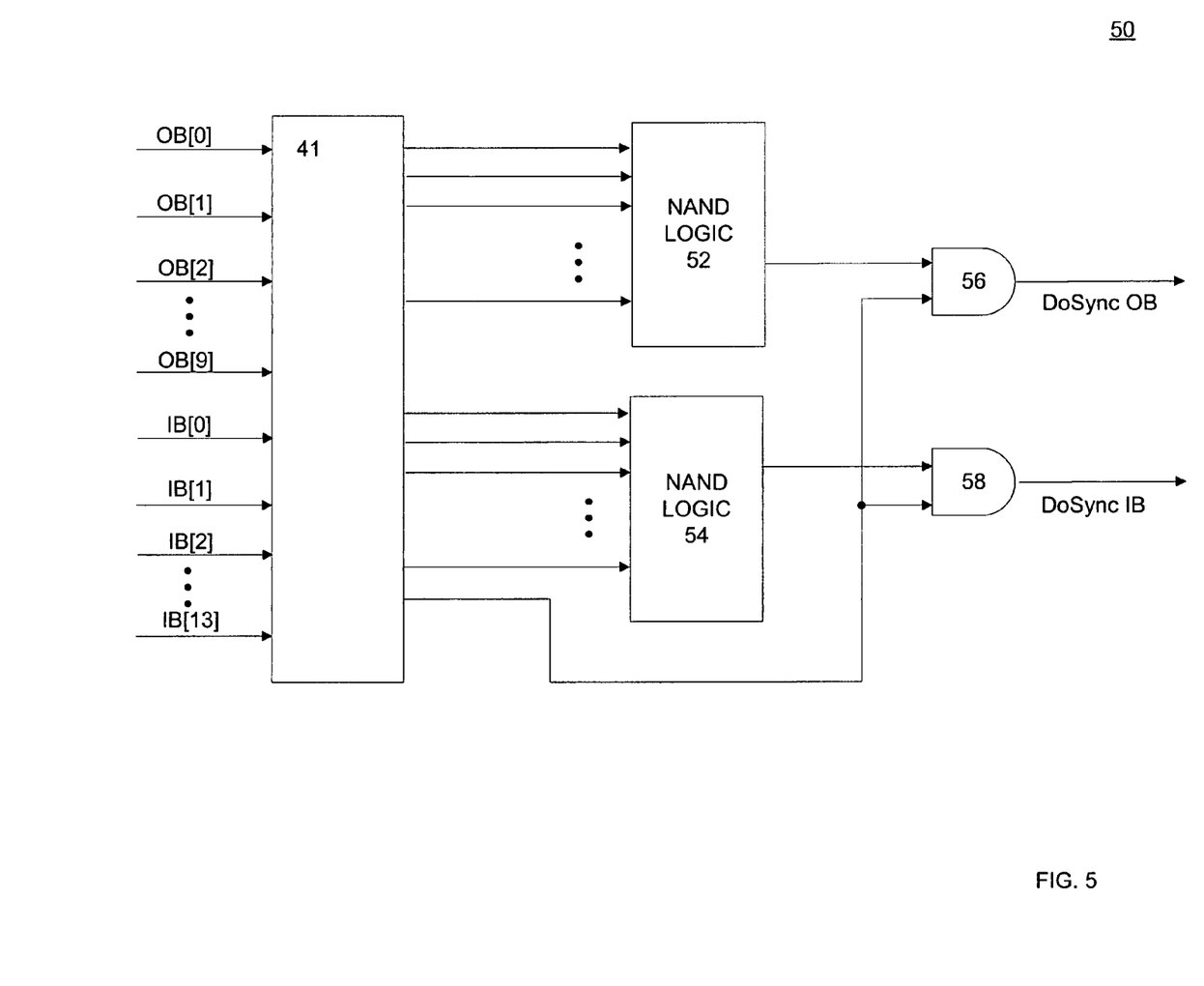
FIG. 5 is a block diagram illustrating a programmable transition density detector according to other embodiments of the invention.

FIG. 5 is a block diagram illustrating a transition density detector according to other embodiments of the invention. The embodiments illustrated by FIG. 5 are the same as those illustrated by FIG. 4 in that functional group 41 includes the same components that are illustrated in FIG. 4. However, in these embodiments there are two NAND logic blocks 52, 54. NAND logic 52 corresponds to the outbound data paths OB[0-9] and NAND logic 54 corresponds to inbound datapaths IB[0-13]. The operation of NAND logic 52, 54 is the same as that of NAND logic 44 of FIG. 4. That is, the output of NAND logic 52 is asserted when one of the outbound data paths OB[0-9] has not reached the programmed data transition density. The output of NAND logic 54 is asserted when one of the inbound data paths IB[0-13] has not reached the programmed data transition density. The output of NAND logic 52 and NAND logic 54 is fed to AND gate 56 and AND gate 58, respectively.

Like the embodiments illustrated by FIG. 4, the other input for AND gate 56 and AND gate 58 is the output of the clock cycle counter 42 (see FIG. 4). According to these embodiments, two signals are generated. DoSyncOB is asserted when one of the outbound data paths requires synchronization signals after the programmed number of clock cycles and DoSyncIB is asserted when one of the inbound data paths requires synchronization signals after the programmed number of clock cycles.

Referring to FIGS. 4 and 5, the signals DoSync, DoSyncOB, and DoSyncIB may be used to trigger the transmittal of synchronization signals only when such synchronization is needed. Thus, bandwidth is not wasted by blindly sending synchronization signals regardless of the actual data transition density of the memory channel. Accordingly, the embodiments illustrated in FIGS. 4 and 5 provide a programmable mechanism that can track the data transition density over a specific time interval for a transmitted signal.

While the programmability of the DTCs [0-23] and the clock cycle counter 42 in these embodiments is a convenient feature, alternative embodiments do not require such a feature. In other words, the DTCs [0-23] and clock cycle counter 42 could simply assert an output when they have reached their limit, which is dependent upon the number of bits in the counter.

Furthermore, the embodiments illustrated in FIGS. 4 and 5 may reside both on the host 210 and the buffer chips 270 of FIG. 2.

Figure 6A:
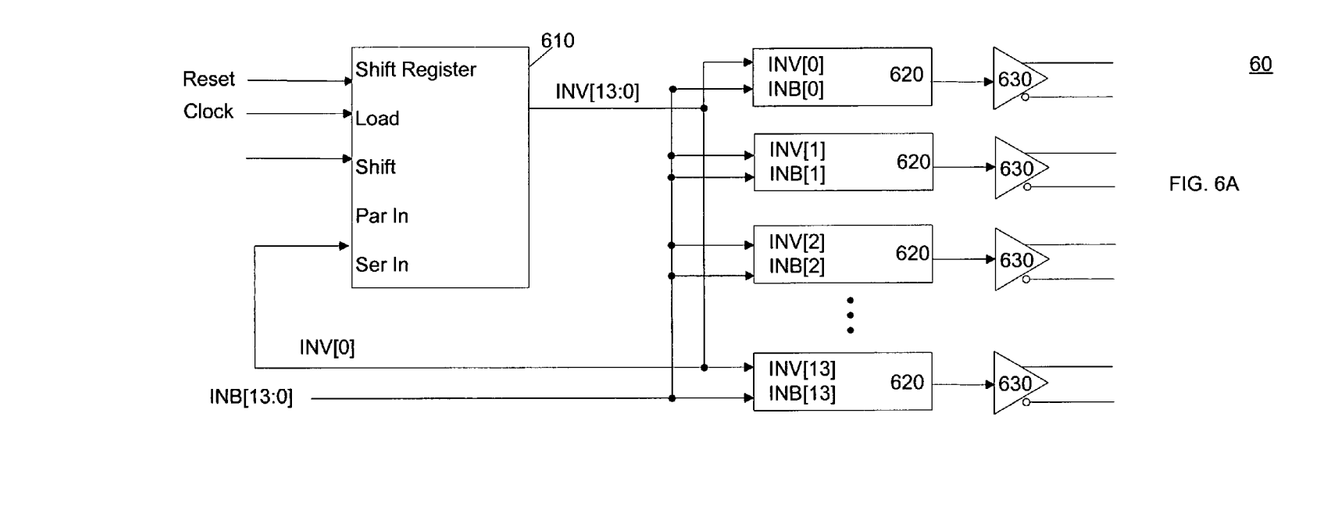
FIG. 6A is a block diagram illustrating a programmable inverter according to still other embodiments of the invention.

FIG. 6A is a block diagram illustrating a programmable transition generator 60 according to still other embodiments of the invention. The transition generator 60 applies data inversions simultaneously to both the transmitter and receiver (not shown) of a buffer chip 270 (FIG. 2) according to a pre-selected data inversion scheme. Thus, by applying data inversions in a pre-selected manner, there is an increased likelihood that the minimum data transition density will be achieved without the host sending mandatory synchronization signals once every predetermined number of clock cycles. The transition generator 60 may reside both on the host 210 and on the buffer chips 270 of FIG. 2.

In FIG. 6A, shift register 610 is a wraparound shift register with 14 storage bits. Each storage bit INV[13:0] in the shift register 610 corresponds to a data lane in the inbound data path INB[13:0]. Each of the storage bits INV[13], INV[12], INV[11], etc., and its corresponding data lane IB[13], IB[12], IB[11], etc., are inputs for a inverter 620. Whenever a storage bit INV[13:0] in the shift register contains a "1" for its corresponding data lane IB[13:0], the corresponding inverter 620 is enabled and that particular data lane operates in an inverted mode.

During operation of the shift register 610, the bits INV[13:0] shift to the right every clock cycle. In other words, the most significant bit INV[13] becomes INV[12], INV[12] becomes INV [11], etc., while the least significant bit INV[0] wraps around to the serial input SerIn, where it becomes the new most significant bit INV[13]. Alternatively, the shift register 610 could be configured so that the bits INV [13:0] shift to the left every clock cycle. The output from the inverters 620 are buffered by a corresponding buffer 630.

FIG. 6A illustrates a transition generator 60 that is configured to handle data transitions in only one direction. That is, the transition generator 60 applies data inversions only to the receiver and transmitter (not shown) that are part of the inbound (IB) data path. For example, if the outbound data path contained 10 data lanes OB[9:0], another data transition generator 60 with 10 storage bits would be required for the receiver and the transmitter on the outbound data path. Alternatively, the data transition generator 60 of FIG. 6A could accommodate both the inbound data path IB[13:0] and outbound data path OB[9:0] if the shift register 610 were replaced with a shift register that was 24 bits long (14 bits for the inbound path and 10 bits for the outbound path). In this case, 10 additional inverters 620 and 10 additional buffers 630 would also be needed to handle the outbound data path.

The shift register 610 may be parallel loaded via ParIn during reset for the host and all DIMMs on the channel, and the contents of the shift register are shifted in synchronization with CLOCK. The shift register 610 operates in lockstep with all components on the channel, that is, the receivers and transmitters on every DIMM are synchronized with the inverting.

Alternatively, the shift register 610 may operate in lockstep only with one other adjacent component on the channel. This is more easily explained with reference to FIG. 2. On the inbound path 215a, the transmitter (not shown) on buffer chip 270 of DIMM 240 operates in lockstep with the receiver (not shown) on buffer chip 270 of DIMM 230. While on the outbound path 215b, the transmitter (not shown) on buffer chip 270 of DIMM 230 operates in lockstep with the receiver (not shown) on buffer chip 270 of DIMM 240. In other words, receivers and transmitters that "face" each other across individual DIMMs or across the host 210 and adjacent DIMM 220 operate in lockstep.

Figure 6B:
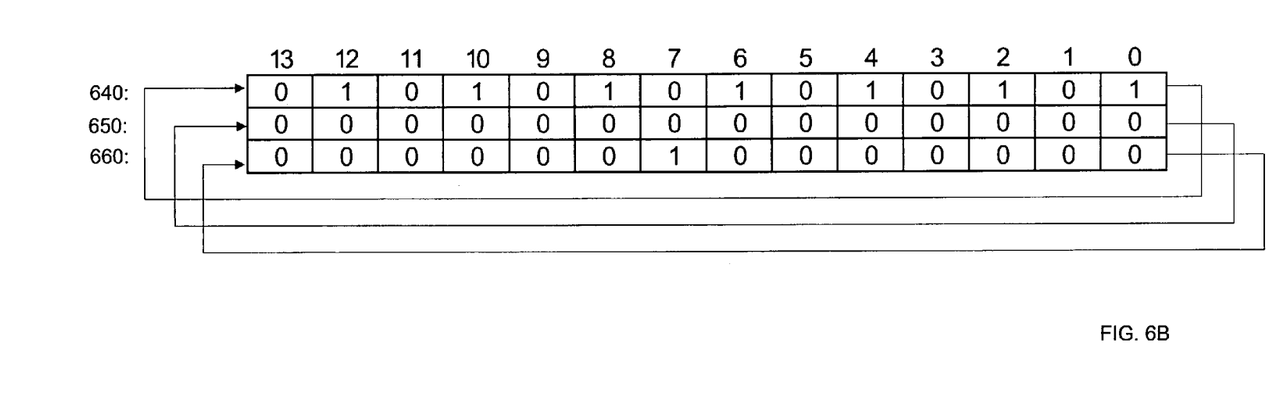
FIG. 6B is a table illustrating some examples of the data inversion schemes that are possible using the embodiments of FIG. 6A.

FIG. 6B is a table illustrating some examples of data inversion schemes that are possible using the embodiments of FIG. 6A. Rows 640, 650, and 660 each contain 14 bits that represent initial values that are parallel loaded into the bit locations INV[13:0] of shift register 610. Row 640 represents a data inversion scheme where the data lanes are inverted every other clock cycle. Row 650 represents a data inversion scheme where no data inversions are applied to the inbound data lanes IB[13:0]. Row 660 represents a marching data inversion scheme where a data inversion is sequentially applied to each of the inbound data lanes IB[13:0], beginning with IB[7], IB[6], . . . , IB[0], IB[13], . . . IB[8], etc., before starting over at IB[7]. The arrows in FIG. 6B illustrate that the bit in the INV[0] location is wrapped around to the INV[12] location during operation of the shift register 610.

Alternatively, the number of storage bits INV[X:0] in the wraparound shift register 610 may be larger (X>Y) than the number of data lanes IB[Y:0] in the inbound data path. For example, in the data inversion scheme illustrated in row 660 of FIG. 6B, a data inversion is applied to each data lane once every 14 clock cycles. If, however, the wrap-around shift register 610 were an 128-bit shift register and the fourteen bits corresponding to the data lanes IB [13:0] were arbitrarily distributed throughout the shift register 610, then using the same pattern as in row 660 the data inversion would be applied to each inbound data lane once every 128 clock cycles, or about nine times slower.

To achieve data inversion frequencies somewhere between once every 14 clock cycles and once every 128 clock cycles, more "1 s" may be added to the pattern of bits that is loaded into INV[13:0] of shift register 610.

Alternatively, the number of storage bits INV [X:0] in the wraparound shift register 610 may be smaller (X<Y) than the number of data lanes IB[Y:0] in the inbound data path. For example, suppose one wished only to implement a data inversion scheme such as the one shown in row 640 of FIG. 6B, where an inversion occurs for a data lane every other clock cycle. In this case, a 2-bit shift register loaded with 1, 0 could be used in place of the 14-bit shift register 610. Half of the inverters 620 would use one bit of the 2-bit shift register as an input, while the other half would use the other bit. Although some versatility would be sacrificed by using the 2-bit register as compared to the 14-bit register, the same data inversion scheme could be achieved as in row 640 of FIG. 6B.

Consequently, it is apparent that the frequency at which data inversions occur on a particular data lane may be controlled by the number of bits in the shift register 610 and the pattern of bits that is loaded into the shift register. Because the transmitter and receiver on each buffer chip 270 are synchronized to operate in an inverted mode, there is no penalty for having too many data transitions on each buffer chip.

Furthermore, while the embodiments illustrated by FIG. 6A and other alternative embodiments described above use a shift register to implement a data inversion scheme, other embodiments may implement data inversions in different ways. For example, a binary counter could be used, since bits in the binary counter switch from 0 to 1 or vice versa with increasing frequency as one goes from the most significant bit to the least significant bit. In this case, in addition to the corresponding data path IB[13:0], the inverters 620 would have as input a selected bit from the counter that switched states at the desired frequency. Many other ways to implement data inversion schemes will be apparent to those skilled in the art.

Having described and illustrated the principles of the invention in several exemplary embodiments, it should be apparent that the invention can be modified in arrangement and detail without departing from such principles. I claim all modifications and variation coming within the spirit and scope of the following claims.

The invention claimed is:

1. A method comprising:
    calculating an achieved data transition density for at least one data lane in a point-to-point memory channel having a plurality of data lanes, the achieved data transition density calculated over greater than two clock cycles; and
    transmitting a synchronization signal on the at least one data lane responsive to the achieved transition density.

2. The method of claim 1, wherein calculating an achieved data transition density for the at least one data lane comprises:
    counting how many times a data transition occurs on the at least one data lane during a predetermined number of clock cycles, the predetermined number of clock cycles being greater than two.

3. The method of claim 2, further comprising:
    storing a desired data transition density for the at least one data lane; and
    comparing the achieved data transition density to the desired data transition density.

4. The method of claim 3, wherein transmitting a synchronization signal on the at least one data lane responsive to the achieved transition density comprises:
    transmitting a synchronization signal on all the data lanes if the achieved data transition density is less then the desired data transition density only on less than all of the data lanes.

5. The method of claim 1, wherein transmitting the synchronization signal on the at least one data lane comprises:
    transmitting the synchronization signal having a number of transitions to cause the achieved data transition density for the at least one data lane to be greater than or equal to a desired data transition density.

6. A memory channel comprising:
a host and a plurality of DIMMs connected in a point-to-point fashion, wherein the host includes a processor;
an outbound data channel and an inbound data channel, each having a plurality of data lanes;
at least one transition detection circuit configured to detect whether an achieved data transition density on at least one data lane is less than a desired data transition density for the at least one data lane; and
a transition generator configured to transmit a synchronization signal on the at least one data lane in response to the achieved transition density if the achieved transition density is less than the desired data transition density;
wherein the achieved transition density is measured over greater than two clock cycles.

7. The memory channel of claim 6, wherein the at least one transition detection circuit is located on the host.

8. The memory channel of claim 6, wherein the at least one transition detection circuit is located on a corresponding one of the plurality of DIMMs.

9. The memory channel of claim 6, wherein the at least one transition detection circuit comprises:
a plurality of data transition detectors, each configured to detect a data transition on a corresponding data lane;
a clock cycle counter;
a plurality of data transition counters, each configured to count the data transitions detected by a corresponding data transition detector, and configured to be reset by the clock cycle counter;
a logic block configured to signal when at least one of the plurality of data transition counters counts, during a time period defined by the clock cycle counter, a number of data transitions detected by the corresponding data transition detector that is less than the desired data transition density.

10. The memory channel of claim 9, wherein the clock cycle counter and the plurality of data transition counters are programmable.

11. The memory channel of claim 9, wherein the logic block comprises an AND gate and a plurality of NAND gates.

12. The memory channel of claim 6, wherein the at least one transition detection circuit comprises:
a plurality of data transition detectors, each configured to detect a data transition on a corresponding data lane;
a clock cycle counter;
a plurality of data transition counters, each configured to count the data transitions detected by a corresponding data transition detector, and configured to be reset by the clock cycle counter;
a first logic block configured to signal when at least one of the plurality of data transition counters corresponding to the data lanes on the outbound data path counts, during a time period defined by the clock cycle counter, a number of data transitions detected by the corresponding data transition detector that is less than the desired data transition density; and
a second logic block configured to signal when at least one of the plurality of data transition counters corresponding to the data lanes on the inbound data path counts, during a time period defined by the clock cycle counter, a number of data transitions detected by the corresponding data transition detector that is less than the desired data transition density.

13. The memory channel of claim 12, wherein the clock cycle counter and the plurality of data transition counters are programmable.

14. The memory channel of claim 12, wherein the first logic block and the second logic block comprise a plurality of NAND gates and an AND gate.

15. The memory channel of claim 6, wherein for each of the at least one transition detection circuit:
the transition detection circuit is configured to detect whether an achieved data transition density on a corresponding one of the at least one data lane is less than the desired data transition density for the corresponding data lane.

16. An article of machine-readable code, embodied on a machine-readable medium, that when executed causes a machine to perform processes comprising:
storing a desired data transition number;
storing a clock cycle number that is greater than two;
for a data lane in a point-to-point memory channel, recording a measured data transition number over a period of clock cycles equal to the clock cycle number;
comparing the measured data transition number to the desired data transition number; and
transmitting a synchronization signal on the data lane in response to the measured data transition number if the measured data transition number is less than the desired data transition number.

* * * * *